US010533257B2

(12) United States Patent
Baniecki et al.

(10) Patent No.: US 10,533,257 B2
(45) Date of Patent: Jan. 14, 2020

(54) PHOTOCHEMICAL ELECTRODE AND HYDROGEN EVOLUTION DEVICE

(71) Applicant: FUJITSU LIMITED, Kawasaki-shi, Kanagawa (JP)

(72) Inventors: John David Baniecki, Zama (JP); Toshihisa Anazawa, Sagamihara (JP); Yoshihiko Imanaka, Atsugi (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 15/671,980

(22) Filed: Aug. 8, 2017

(65) Prior Publication Data

US 2018/0044803 A1    Feb. 15, 2018

(30) Foreign Application Priority Data

Aug. 10, 2016 (JP) ................. 2016-157570

(51) Int. Cl.
C25B 1/00    (2006.01)
C25B 1/02    (2006.01)

(52) U.S. Cl.
CPC ............... C25B 1/003 (2013.01); C25B 1/02 (2013.01)

(58) Field of Classification Search
CPC .................. C25B 1/003; C25B 1/02
See application file for complete search history.

(56) References Cited

U.S. PATENT DOCUMENTS

| 2010/0133111 A1* | 6/2010 | Nocera | C25B 1/003 205/633 |
| 2011/0062017 A1* | 3/2011 | Elangovan | C25B 1/02 204/242 |
| 2011/0203661 A1 | 8/2011 | Taniguchi et al. | |
| 2012/0267234 A1* | 10/2012 | Reece | B01J 19/127 204/157.5 |
| 2013/0240874 A1* | 9/2013 | Maekawa | H01L 29/66136 257/43 |
| 2017/0033246 A1* | 2/2017 | Lee | H01L 31/035263 |

FOREIGN PATENT DOCUMENTS

| JP | 2012-505310 | 3/2012 |
| JP | 2012-148216 | 8/2012 |
| WO | 2010042196 | 4/2010 |
| WO | 2010/125787 | 11/2010 |

OTHER PUBLICATIONS

Wang et al. Research progress of perovskite materials in photocatalysis- and photovoltaics-related energy conversion and environmental treatment. The Royal Society of Chemistry. Chem Soc Rev. Volmen 44, pp. 5371-5408. (Year: 2015).*

* cited by examiner

*Primary Examiner* — Ciel P Thomas
(74) *Attorney, Agent, or Firm* — Fujitsu Patent Center

(57) ABSTRACT

A photochemical electrode includes a conductive oxide. Fermi energy of the conductive oxide is higher than a first energy minimum of a first band having a lowest energy and is lower than a second energy minimum of a second band having a higher energy than the first band among bands whose curvatures are positive in reciprocal space. The first energy minimum and the second energy minimum are at the same point of wave vector. A difference between the second energy minimum and the first energy minimum is not less than 1 eV nor more than 3 eV, and is smaller than a difference between the first energy minimum and an energy maximum of a band having a highest energy among bands whose curvatures are negative.

5 Claims, 3 Drawing Sheets

PHOTOCHEMICAL ELECTRODE AND HYDROGEN EVOLUTION DEVICE

CROSS-REFERENCE TO RELATED APPLICATION

This application is based upon and claims the benefit of priority of the prior Japanese Patent Application No. 2016-157570, filed on Aug. 10, 2016, the entire contents of which are incorporated herein by reference.

FIELD

The embodiments discussed herein are directed to a photochemical electrode and a hydrogen evolution device.

BACKGROUND

Researches have been made on technology for hydrogen evolution through reduction of hydrogen ions using sunlight. This technology produces hydrogen gas at a cathode-side photochemical electrode containing a conductive oxide.

However, in conventional photochemical electrodes, it is not possible to produce hydrogen gas highly efficiently, unless an electrical bias is applied.

Patent Document 1: Japanese National Publication of International Patent Application No. 2012-505310
Patent Document 2: International Publication Pamphlet No. 2010/125787
Patent Document 3: Japanese Laid-Open Patent Publication No. 2012-148216

SUMMARY

According to an aspect of the embodiments, a photochemical electrode includes a conductive oxide. Fermi energy of the conductive oxide is higher than a first energy minimum of a first band having a lowest energy and is lower than a second energy minimum of a second band having a higher energy than the first band among bands whose curvatures are positive in reciprocal space. The first energy minimum and the second energy minimum are at the same point of wave vector. A difference between the second energy minimum and the first energy minimum is not less than 1 eV nor more than 3 eV, and is smaller than a difference between the first energy minimum and an energy maximum of a band having a highest energy among bands whose curvatures are negative.

According to another aspect of the embodiments, a hydrogen evolution device includes: an electrolyte containing hydrogen ion; a photochemical electrode containing a conductive oxide in the electrolyte; and an anode electrode in the electrolyte. Fermi energy of the conductive oxide is higher than a first energy minimum of a first band having a lowest energy and is lower than a second energy minimum of a second band having a higher energy than the first band among bands whose curvatures are positive in reciprocal space. The first energy minimum and the second energy minimum are at the same point of wave vector. A difference between the second energy minimum and the first energy minimum is not less than 1 eV nor more than 3 eV, and is smaller than a difference between the first energy minimum and an energy maximum of a band having a highest energy among bands whose curvatures are negative. The second energy minimum is higher than a redox potential of the electrolyte.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

What is important to produce hydrogen gas at a photochemical electrode through reduction of hydrogen ions is that an energy minimum of a conduction band of a conductive oxide contained in the photochemical electrode is higher than a redox potential E ($H^+/H_2$) of an electrolyte containing the hydrogen ions. Further, a band gap of the conductive oxide desired for the efficient excitation of electrons is about 1 eV to 3 eV, since the peak of energy of sunlight is about 1 eV to 2 eV and energy of visible light is about 1.8 eV to 3.1 eV. As a result of studious studies by the inventors of the present application, however, it has been found out that, with photochemical electrodes conventionally used for the production of hydrogen gas, it is not possible to satisfy the both requirements. As a result of further studious studies by the inventors of the present application, it has been found out that making the photochemical electrode contain a specific conductive oxide is effective.

Hereinafter, embodiments will be specifically described with reference to the attached drawings.

First Embodiment

Figure 1:
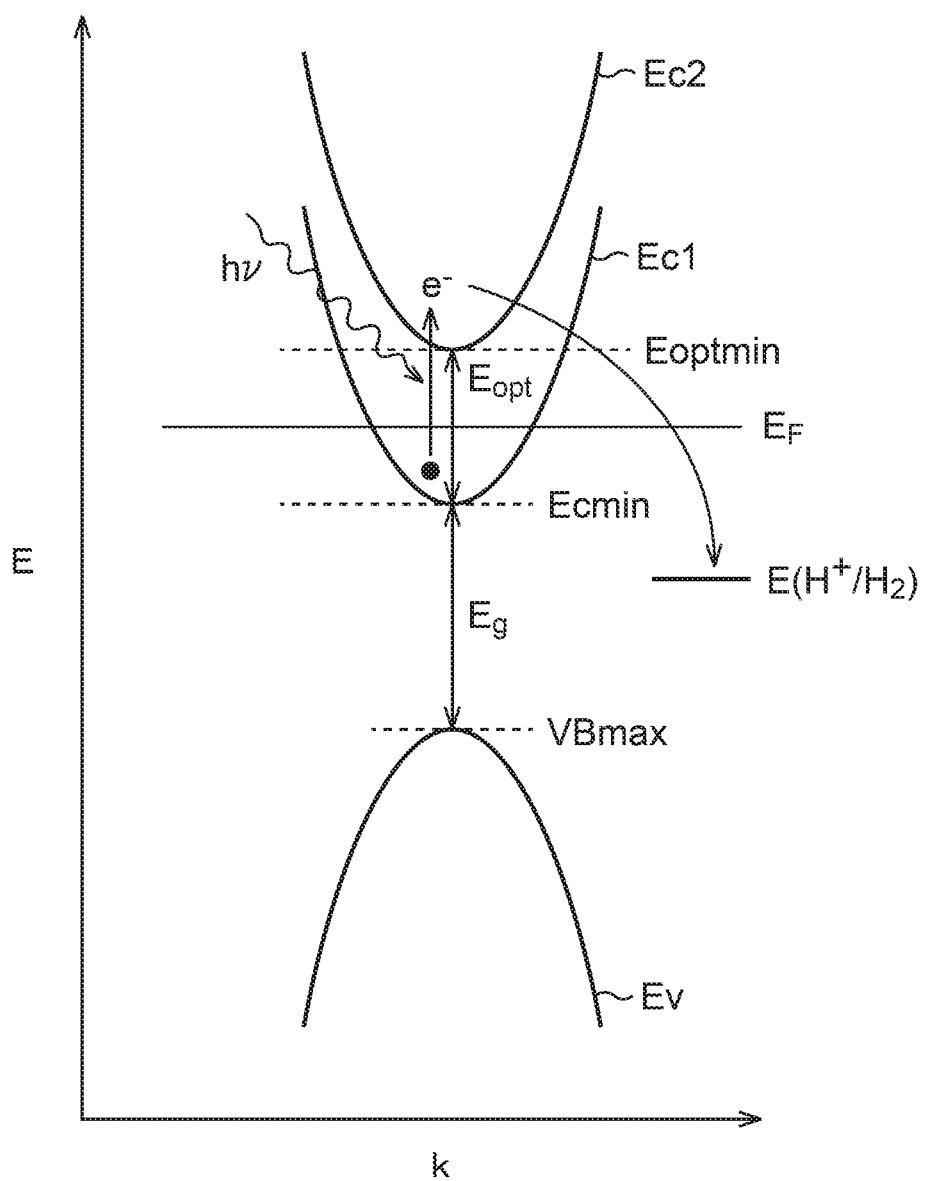
FIG. 1 is a graph illustrating a band structure of a conductive oxide contained in a photochemical electrode according to a first embodiment.

First, a first embodiment will be described. The first embodiment is an example of a photochemical electrode. FIG. 1 is a graph illustrating a band structure of a conductive oxide contained in the photochemical electrode according to the first embodiment.

The photochemical electrode according to the first embodiment contains a conductive oxide. As illustrated in FIG. 1, Fermi energy $E_F$ of the conductive oxide is higher than a first energy minimum Ecmin of a first band Ec1 having a lowest energy and is lower than a second energy minimum Eoptmin of a second band Ec2 having a higher energy than the first band Ec1 among bands whose curvatures are positive in reciprocal space. The first energy minimum Ecmin and the second energy minimum Eoptmin are at the same point of wave vector. A difference Eopt between the second energy minimum Eoptmin and the first energy minimum Ecmin is not less than 1 eV nor more than 3 eV, and is smaller than a difference (band gap) Eg between the first energy minimum Ecmin and an energy maximum VBmax of a band Ev having a highest energy among bands whose curvatures are negative.

In the first embodiment, as illustrated in FIG. 1, electrons can exist in the first band Ec1 since the Fermi energy $E_F$ is higher than the first energy minimum Ecmin. Further, it is possible to efficiently photoexcite the electrons in the first band Ec1 to the second band Ec2 since the energy difference Eopt is not less than 1 eV nor more than 3 eV. When the second energy minimum Eoptmin is higher than a redox potential E ($H^+/H_2$) of an electrolyte in contact with the photochemical electrode, hydrogen ions contained in the electrolyte can be reduced to hydrogen gas.

For example, the conductive oxide is $SrSnO_3$ containing 3 at % La. The Fermi energy of this conductive oxide is higher by about 0.5 eV than the energy minimum Ecmin of the first band Ec1 having the lowest energy, and is lower by about 2 eV than the second energy minimum Eoptmin of the second band Ec2 having a higher energy than the first band Ec1 among bands whose curvatures are positive. The energy minimum Ecmin and the energy minimum Eoptmin are at the same Γ point of wave vector. The difference Eopt between the energy minimum Eoptmin and the energy minimum Ecmin is about 2.5 eV, and is smaller than the band gap Eg (5 eV). For example, a $SrSnO_3$ film containing 3 at % La may be deposited on a $SrTiO_3$ substrate containing Nb by a pulsed laser deposition (PLD) method. A photochemical electrode manufactured in this manner includes the $SrTiO_3$ substrate containing Nb and the $SrSnO_3$ film containing 3 at % La. For example, the thickness of the $SrTiO_3$ substrate containing Nb may be 0.5 mm, and the thickness of the $SrSnO_3$ film containing 3 at % La may be 100 nm.

For example, the conductive oxide is $SrSnO_3$ containing 4 at % La. The Fermi energy of this conductive oxide is higher by about 0.6 eV than the energy minimum Ecmin of the first band Ec1 having the lowest energy, and is lower by about 2 eV than the second energy minimum Eoptmin of the second band Ec2 having a higher energy than the first band Ec1 among bands whose curvatures are positive. The energy minimum Ecmin and the energy minimum Eoptmin are at the same Γ point of wave vector. The difference Eopt between the energy minimum Eoptmin and the energy minimum Ecmin is about 2.6 eV, and is smaller than the band gap Eg (5 eV). For example, a $SrSnO_3$ film containing 4 at % La may be deposited on a $SrTiO_3$ substrate containing La by a PLD method. A photochemical electrode manufactured in this manner includes the $SrTiO_3$ substrate containing La and the $SrSnO_3$ film containing 4 at % La. For example, the thickness of the $SrTiO_3$ substrate containing La may be 0.5 mm, and the thickness of the $SrSnO_3$ film containing 4 at % La may be 100 nm.

Preferably, the conductive oxide contains impurities, and a crystal structure of the conductive oxide is a perovskite structure. The conductive oxide is not limited to $SrSnO_3$ containing La, and examples thereof also include $SrSn_{1-y}Sb_yO_3$, $Sr_{1-x}Ba_xSnO_3$ containing La (Nb), $Sr_{1-x}Ca_xSnO_3$, $Sr_{1-x}Ba_xSn_{1-y}Sb_yO_3$, and $Sr_{1-x}Ca_xSn_{1-y}Sb_yO_3$ (0<x<1, 0≤y<1). The concentration of La contained in $SrSnO_3$ may be 5 at %. The impurities contained in $SrSnO_3$ may be Nb, or may be both of La and Nb. The composition of the conductive oxide may be represented by $ABO_{3-d}$ (0<d<0.5) and the band structure illustrated in FIG. 1 may be achieved by oxygen vacancies. Examples of the conductive oxide whose composition is represented by $ABO_{3-d}$ include $SrSnO_{3-d}$, $SrSn_{1-y}Sb_yO_{3-d}$, $Sr_{1-x}Ba_xSnO_{3-d}$, $Sr_{1-x}Ca_xSnO_{3-d}$, $Sr_{1-x}Ba_xSn_{1-y}Sb_yO_{3-d}$, and $Sr_{1-x}Ca_xSn_{1-y}Sb_yO_{3-d}$ (0<x<1, 0≤y<1).

When the difference Eopt between the second energy minimum Eoptmin and the first energy minimum Ecmin is not less than 1 eV nor more than 2 eV and the difference Eg between the first energy minimum Ecmin and the energy maximum VBmax is not less than 2 eV nor more than 4 eV, it is possible to more improve the efficiency of the photo-excitation using sunlight. The second band Ec2 is, for example, a band having the lowest energy next to the first band Ec1 at the point (for example, the Γ point) of the wave vector at which the energy of the first band Ec1 is lowest in reciprocal space.

Second Embodiment

Figure 2:
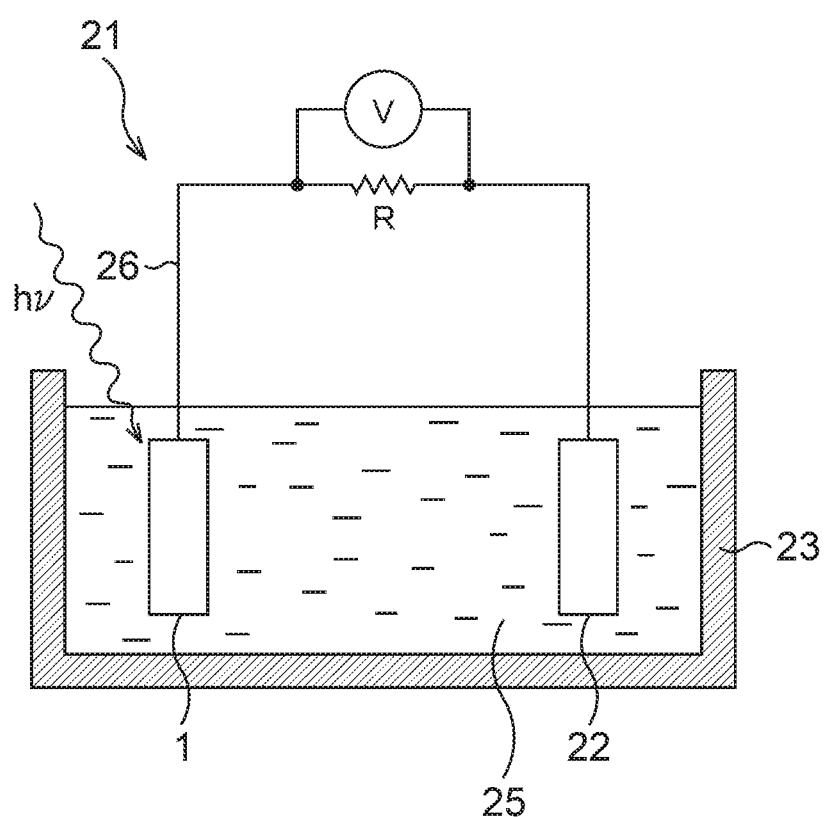
FIG. 2 is a view illustrating a structure of a hydrogen evolution device according to a second embodiment.

Next, a second embodiment will be described. The second embodiment relates to a hydrogen evolution device including the photochemical electrode. FIG. 2 is a view illustrating a structure of the hydrogen evolution device according to the second embodiment.

As illustrated in FIG. 2, the hydrogen evolution device 21 according to the second embodiment includes a hydrogen ion ($H^+$)-containing electrolyte 25 stored in a bath 23, the photochemical electrode 1 according to the first embodiment in the electrolyte 25, and an anode electrode 22 in the electrolyte 25. The photochemical electrode 1 and the anode electrode 22 are electrically connected to each other through a wiring 26 outside the electrolyte 25. The electrolyte 25 is, for example, a nitrous acid electrolyte, a sulfurous acid electrolyte, or a carbonic acid electrolyte. The energy minimum Eoptmin of the second band Ec2 of the photochemical electrode is higher than a redox potential E ($H^+/H_2$) of the electrolyte 25.

In the nitrous acid electrolyte, the following electrolytic dissociation takes place.

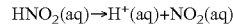

In the sulfurous acid electrolyte, the following electrolytic dissociation takes place.

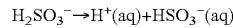

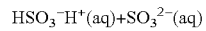

In the carbonic acid electrolyte, the following electrolytic dissociation takes place.

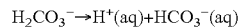

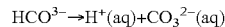

According to the hydrogen evolution device 21, when light irradiates the photochemical electrode 1, electrons in the first band Ec1 are photoexcited to the second band Ec2 highly efficiently. Then, the hydrogen ions in the electrolyte 25 are reduced and hydrogen gas is produced, since the energy minimum Eoptmin of the second band Ec2 of the photochemical electrode is higher than the redox potential E ($H^+/H_2$) of the electrolyte 25.

Third Embodiment

Figure 3:
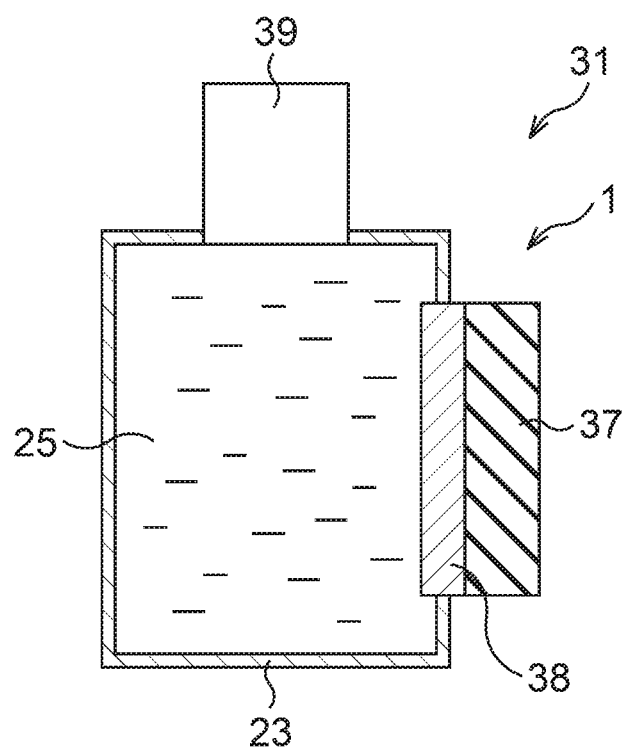
FIG. 3 is a view illustrating a structure of a hydrogen evolution device according to a third embodiment.

Next, a third embodiment will be described. The third embodiment relates to a hydrogen evolution device including the photochemical electrode. FIG. 3 is a view illustrating a structure of the hydrogen evolution device according to the third embodiment. The structure of only a cathode side is illustrated for convenience' sake.

As illustrated in FIG. 3, in the hydrogen evolution device 31 according to the third embodiment, the photochemical electrode 1 is attached to the bath 23, with a substrate 37 included in the photochemical electrode 1 being outside the bath 23 and a conductive oxide film 38 included in the photochemical electrode 1 being in contact with the electrolyte 25 in the bath 23. Further, a hydrogen collecting unit 39 that collects hydrogen gas produced in the electrolyte 25 is disposed on an upper portion of the bath 23. The other structure is the same as that of the second embodiment.

According to the third embodiment, the efficient production of the hydrogen gas is also possible owing to the photochemical electrode 1 according to the first embodiment included therein as in the second embodiment. The hydrogen gas collected in the hydrogen collecting unit 39 can be used as, for example, fuel gas.

As one aspect, since the photochemical electrode includes the conductive oxide having the appropriate Fermi energy, it is possible to produce hydrogen gas highly efficiently without applying an electrical bias.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A hydrogen evolution device comprising:
   an electrolyte containing hydrogen ion;
   a photochemical electrode containing a conductive oxide in the electrolyte; and
   an anode electrode in the electrolyte, wherein:
   a composition of the conductive oxide is $Sr_{1-x}Ba_xSn_{1-y}Sb_yO_3$ or $Sr_{1-x}Ca_xSn_{1-y}Sb_yO_3$ ($0<x<1$, $0<y<1$) containing La for not less than 3 at % nor more than 5 at % or sum of both La and Nb for not less than 3 at % nor more than 5 at %,
   Fermi energy of the conductive oxide is higher than a first energy minimum of a first band having a lowest energy and is lower than a second energy minimum of a second band having a higher energy than the first band among bands whose curvatures are positive in reciprocal space;
   the first energy minimum and the second energy minimum are at the same point of wave vector;
   a difference between the second energy minimum and the first energy minimum is not less than 1 eV nor more than 3 eV, and is smaller than a difference between the first energy minimum and an energy maximum of a band having a highest energy among bands whose curvatures are negative; and
   the second energy minimum is higher than a redox potential of the electrolyte.

2. The hydrogen evolution device according to claim 1, wherein:
   hydrogen gas is generated by reducing hydrogen ion contained in the electrolyte in a state where no electrical bias is applied to the photochemical electrode.

3. A photochemical electrode comprising:
   a conductive oxide, wherein:
   the conductive oxide is $Sr_{1-x}Ba_xSn_{1-y}Sb_yO_3$ or $Sr_{1-x}Ca_xSn_{1-y}Sb_yO_3$ ($0<x<1$, $0<y<1$) containing La for not less than 3 at % nor more than 5 at % or sum of both La and Nb for not less than 3 at % nor more than 5 at %,
   Fermi energy of the conductive oxide is higher than a first energy minimum of a first band having a lowest energy and is lower than a second energy minimum of a second band having a higher energy than the first band among bands whose curvatures are positive in reciprocal space;
   the first energy minimum and the second energy minimum are at the same point of wave vector; and
   a difference between the second energy minimum and the first energy minimum is not less than 1 eV nor more than 3 eV, and is smaller than a difference between the first energy minimum and an energy maximum of a band having a highest energy among bands whose curvatures are negative.

4. The photochemical electrode according to claim 3, wherein:
   the photochemical electrode is not applied an electrical bias.

5. The photochemical electrode according to claim 3, wherein:
   the difference between the second energy minimum and the first energy minimum is not less than 1 eV nor more than 2 eV; and
   the difference between the first energy minimum and the energy maximum is not less than 2 eV nor more than 4 eV.

* * * * *